(12) United States Patent
   Wu

(10) Patent No.: US 8,967,401 B2
(45) Date of Patent: Mar. 3, 2015

(54) SUPPORTING BASE FOR STABILIZING AN ANGLE IRON POST OF A CABINET

(71) Applicant: Meng-Tsung Wu, Taichung (TW)

(72) Inventor: Meng-Tsung Wu, Taichung (TW)

( * ) Notice: Subject to any disclaimer, the term of this patent is extended or adjusted under 35 U.S.C. 154(b) by 0 days.

(21) Appl. No.: 14/056,922

(22) Filed: Oct. 17, 2013

(65) Prior Publication Data

US 2014/0110366 A1    Apr. 24, 2014

(30) Foreign Application Priority Data

Oct. 24, 2012 (TW) .............................. 101220525 U

(51) Int. Cl.
   *A47B 47/00*    (2006.01)
   *F16B 7/00*     (2006.01)
   *A47F 5/00*     (2006.01)
   *F16M 13/02*    (2006.01)
   *B62B 5/00*     (2006.01)

(52) U.S. Cl.
   CPC .............. *A47F 5/0018* (2013.01); *F16M 13/02* (2013.01); *B62B 5/00* (2013.01)
   USPC ...................... 211/191; 248/188.2; 312/265.4; 403/217

(58) Field of Classification Search
   USPC ........... 211/26, 103, 135, 186, 187, 189, 190, 211/191, 192, 207; 248/129, 165, 188, 248/188.1, 188.2, 188.8, 677; 108/106, 108/107, 147.15; 312/265.1–265.4; 403/217, 218, 219, 231, 295
   See application file for complete search history.

(56) References Cited

U.S. PATENT DOCUMENTS

| | | | | |
|---|---|---|---|---|
| 331,211 A * | 11/1885 | Osborn et al. | ..................... | 16/29 |
| 499,783 A * | 6/1893 | Frank | ................. | 16/29 |
| 714,981 A * | 12/1902 | Wells | ............................ | 108/189 |
| 742,770 A * | 10/1903 | Wheeler | ........................ | 16/29 |
| 1,442,097 A * | 1/1923 | Rowntree | ......................... | 16/29 |
| 1,512,353 A * | 10/1924 | Marcus | ............................ | 16/29 |
| RE16,133 E * | 8/1925 | Smithfield | ....................... | 16/29 |
| 1,758,000 A * | 5/1930 | Herold | ............................. | 16/29 |
| 1,800,148 A * | 4/1931 | Conwell et al. | ............ | 248/188.8 |
| 1,854,777 A * | 4/1932 | Bales | ........................ | 211/126.15 |
| 2,725,667 A * | 12/1955 | Ingarra | ..................... | 248/188.4 |
| 2,738,539 A * | 3/1956 | Schultz, Jr. | ....................... | 16/29 |
| 2,738,540 A * | 3/1956 | Kramcsak, Jr. | ................... | 16/29 |
| 3,639,942 A * | 2/1972 | Ostrom | ............................ | 16/29 |
| 4,015,808 A * | 4/1977 | Carroll | ....................... | 248/188.4 |
| 4,187,578 A * | 2/1980 | Little | ............................... | 16/29 |
| 4,459,920 A * | 7/1984 | Cwik | ............................ | 108/107 |
| 5,312,078 A * | 5/1994 | Marsh | ........................ | 248/220.1 |
| 6,324,724 B1 * | 12/2001 | Reilly, Jr. | ........................ | 16/29 |
| 6,408,482 B1 * | 6/2002 | Henriott et al. | ..................... | 16/29 |
| 6,701,570 B2 * | 3/2004 | Henriott et al. | ..................... | 16/29 |
| 6,902,068 B1 * | 6/2005 | Fontana et al. | ................. | 211/26 |
| 6,968,962 B2 * | 11/2005 | Toma | ............................ | 211/182 |
| 7,252,202 B2 * | 8/2007 | Saltzberg et al. | ............. | 211/187 |
| 2005/0115913 A1 * | 6/2005 | Toma | ............................ | 211/182 |

* cited by examiner

*Primary Examiner* — Joshua Rodden

(57) ABSTRACT

A supporting base for an angle iron post includes an angle bar and a column. The angle bar has two walls arranged at right angle to each other to be attached to two respective walls of the angle iron post. The column is disposed in between the two walls of the angle bar and has an upper small-diameter section, a lower large-diameter section and a shoulder defined at the junction between the upper small-diameter section and the lower large-diameter section. As such, the two walls of the angle iron post are allowed to be rested on the shoulder of the column and held in position between the walls of the angle bar and the upper small-diameter section of the column.

9 Claims, 7 Drawing Sheets is supporting base for stabilizing an angle iron post of a cabinet

BACKGROUND OF THE INVENTION

1. Field of the Invention

The present invention relates to supporting bases for angle iron posts, and more particularly to supporting bases to provide support to stabilize angle iron posts of a cabinet.

2. Description of the Related Art

As shown in FIG. 6, a conventional cabinet 900 includes four angle iron posts 90, at least one panel 91 interconnecting the angle iron posts 90, and four supporting bases 92 mounted on the lower ends of the angle iron posts 90 to provide support to stabilize the angle iron posts 90. Moreover, four casters 93 are disposed underneath the supporting bases 92 to allow the cabinet 900 to be moved.

As shown in FIG. 7, the supporting base 92 generally includes a base plate 920 and two side walls 921 extending upward from the base plate 920. Specifically, the base plate 920 and the two side walls 921 of the supporting base 92 are configured in shape and size to accommodate the lower end of the angle iron post 90. The angle iron post 90 is secured on the side walls of the supporting base 92 by means of bolts and nuts (shown but not numbered). And, the caster 93 is bolted to a bottom of the base plate 920.

As described above, the conventional cabinet 900 can be easily made; however, there is still room for improvement of the supporting bases 92 to provide a stronger support for the angle iron posts 90 and keep the cabinet 900 from shaking while subjected to exterior forces.

SUMMARY OF THE INVENTION

Accordingly, it is an object of the present invention to provide an improved supporting base for stabilizing an angle iron post of a cabinet.

Specifically, the supporting base includes an angle bar and a column. The angle bar has two walls arranged at right angle to each other to be attached to two respective walls of the angle iron post. The column is disposed in between the two walls of the angle bar and has an upper small-diameter section, a lower large-diameter section and a shoulder defined at the junction between the upper small-diameter section and the lower large-diameter section. In this manner, the two walls of the angle iron post are allowed to be rested on the shoulder of the column and held in position between the walls of the angle bar and the upper small-diameter section of the column.

In another aspect, it is an object of the present invention to provide a cabinet which includes angle iron posts, angle iron beams interconnected with the angle iron posts, and the improved supporting base as described above to provide stronger support for the angle iron posts.

Further benefits and advantages of the present invention will become apparent after a careful reading of the detailed description with appropriate reference to the accompanying drawings.

DETAILED DESCRIPTION OF EMBODIMENTS

Figure 1:
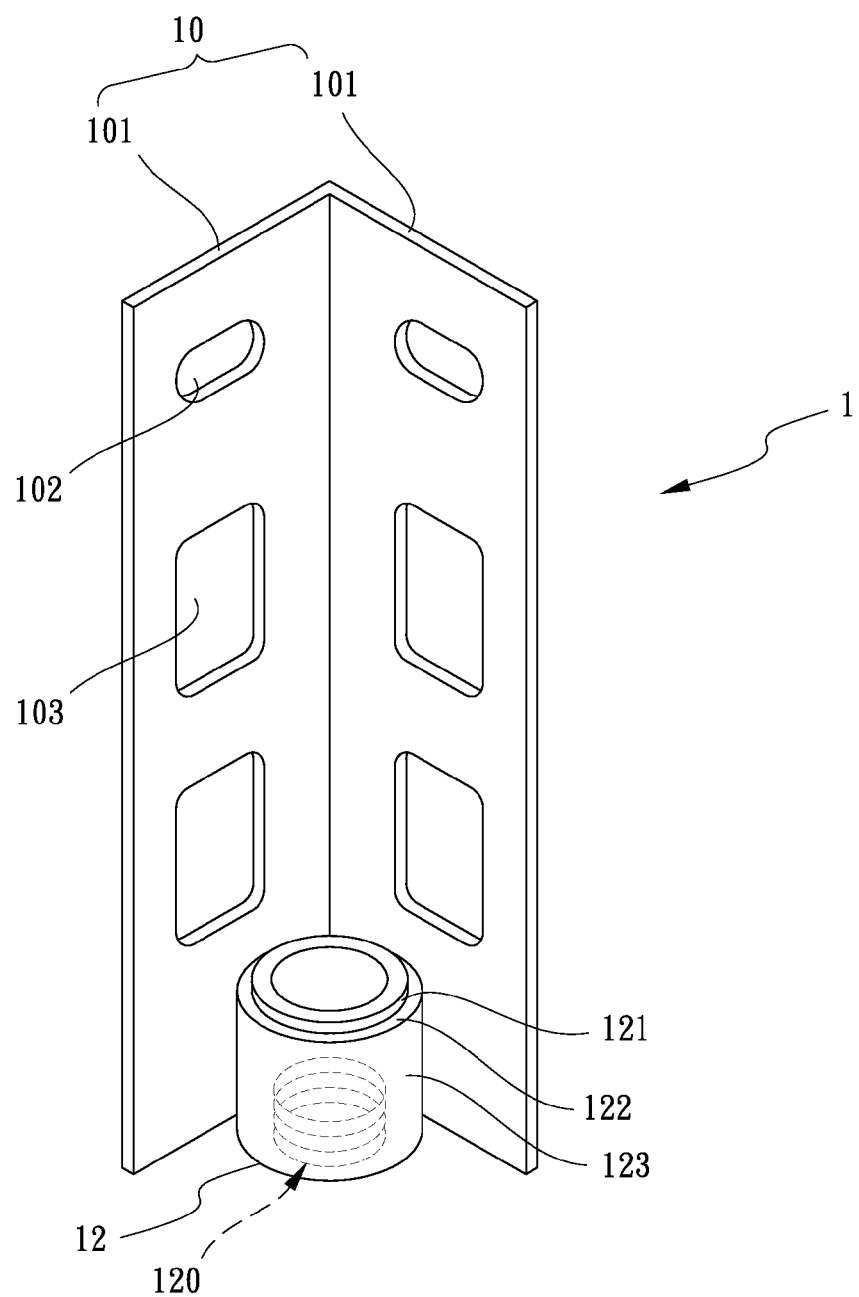
FIG. 1 is a perspective view of a supporting base in accordance with the preferred embodiment of the present invention.
Figure 2:
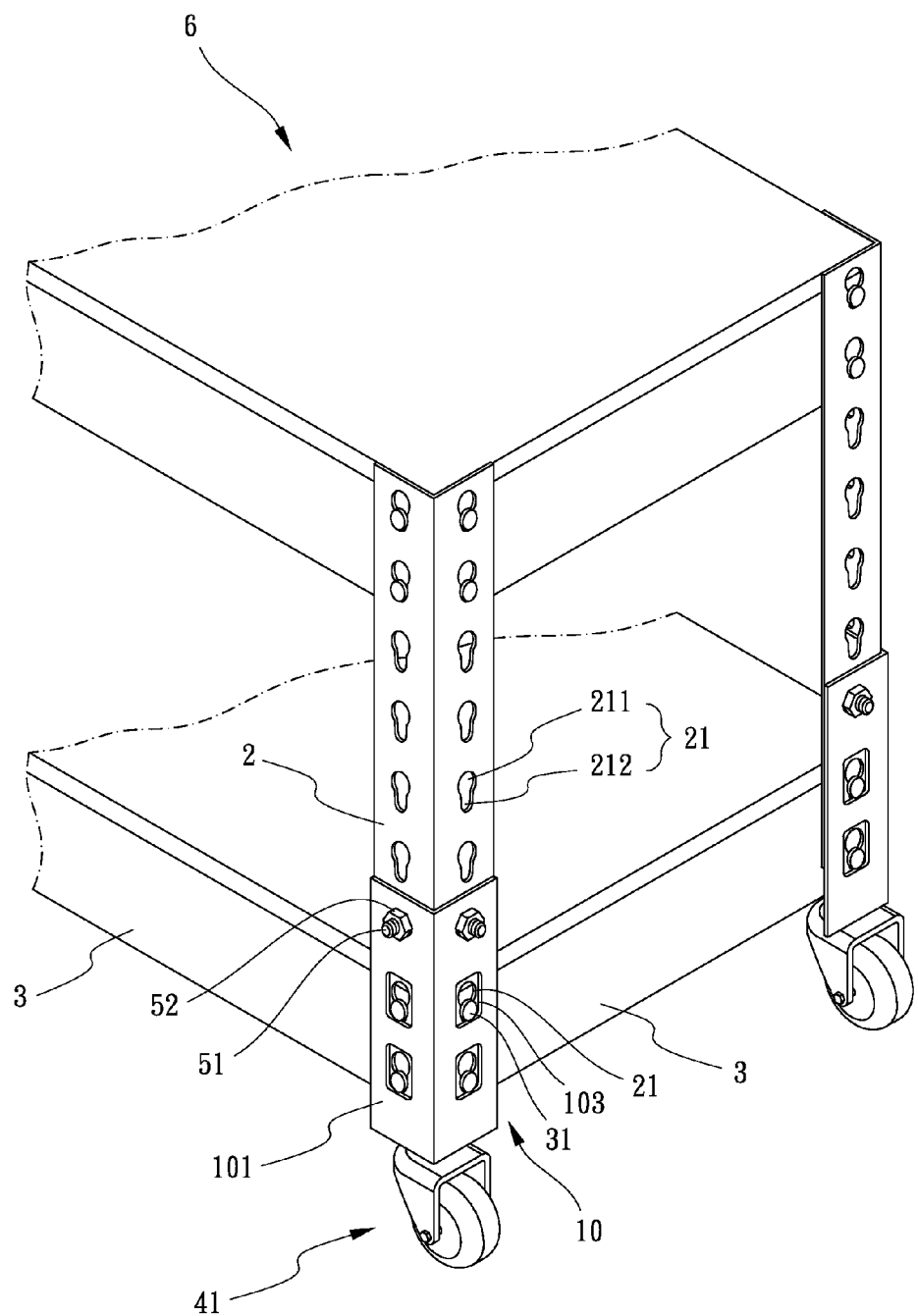
FIG. 2 is a perspective view of a cabinet using the supporting base shown in FIG. 1.

Referring to FIG. 1, there is shown a preferred embodiment of a supporting base 1 to provide strong support to stabilize an angle iron post 2 of a cabinet 6, as shown in FIG. 2. The cabinet 6 generally includes four vertical angle iron posts 2, four horizontal angle iron beams 3 interconnected with the angle iron posts 2, and four supporting bases 1 each sustaining a respective one of the four angle iron posts 2.

Figure 4:
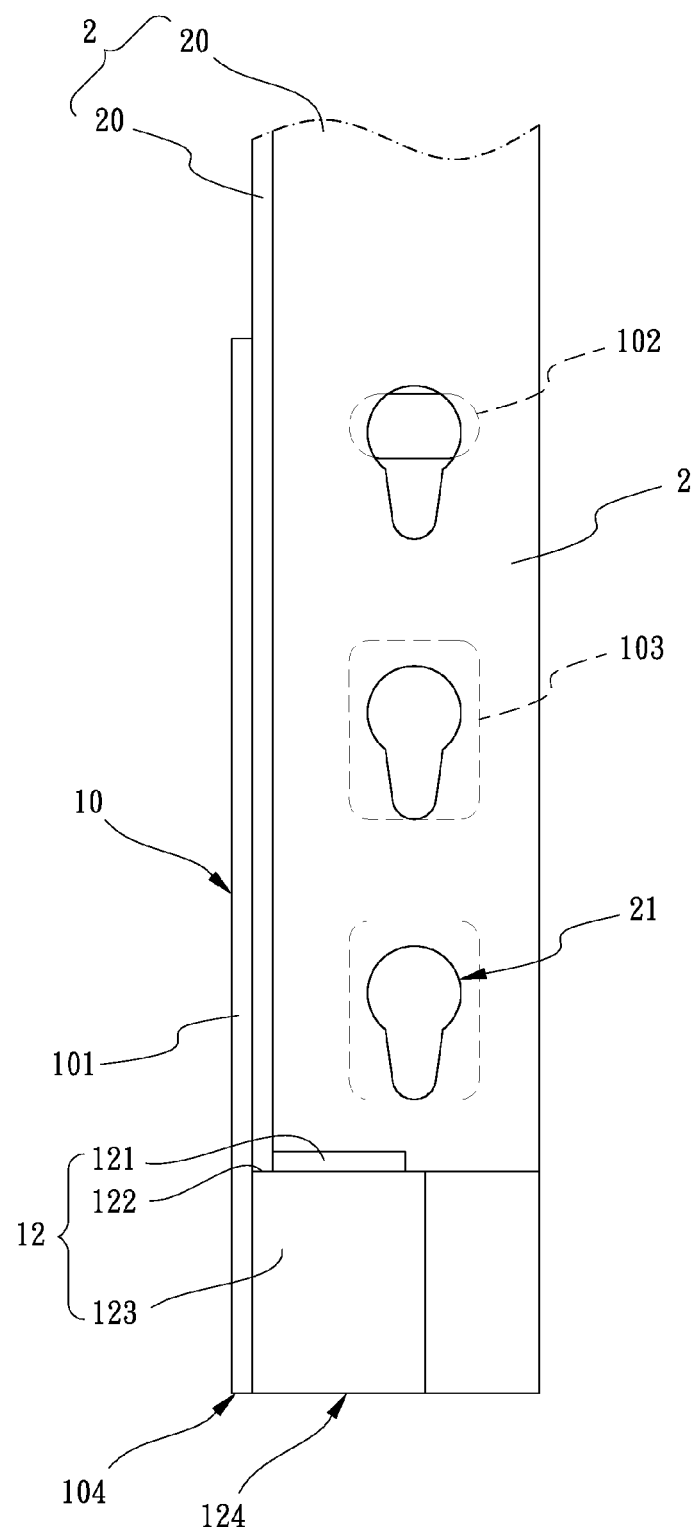
FIG. 4 is a side view of a combination of the supporting base and an angle iron post of the cabinet shown in FIG. 3.

As shown in FIG. 1, the supporting base 1 generally includes a vertical angle bar 10 and a column 12. The angle bar 10 is formed of two metallic walls 101 arranged at right angle to each other. The column 12 is disposed in between the two walls 101 of the angle bar 10 and secured to the adjacent walls 101 by welding. In particular, the column 12 has an upper small-diameter section 121, a lower large-diameter section 123 and a shoulder 122 defined at the junction between the upper small-diameter section 121 and the lower large-diameter section 122. Thus, as shown in FIG. 4, the two walls 20 of the angle iron post 2 are allowed to be rested on the shoulder 122 of the column 12 and held in position between the walls 101 of the angle bar 10 and the upper small-diameter section 121 of the column 12. Moreover, the column 12 has a bottom surface 124 that is flushed with a bottom surface 104 of the angle bar 10, as depicted in FIG. 4, so that when the supporting base 1 is directly placed on a floor or a table to support the angle iron post 2, the column 12 will not be held in suspension by the walls 101 of the angle bar 10 but contact with the floor or the table to sustain the weight of the angle iron post 2, ensuring the stability of the cabinet 6.

Figure 3:
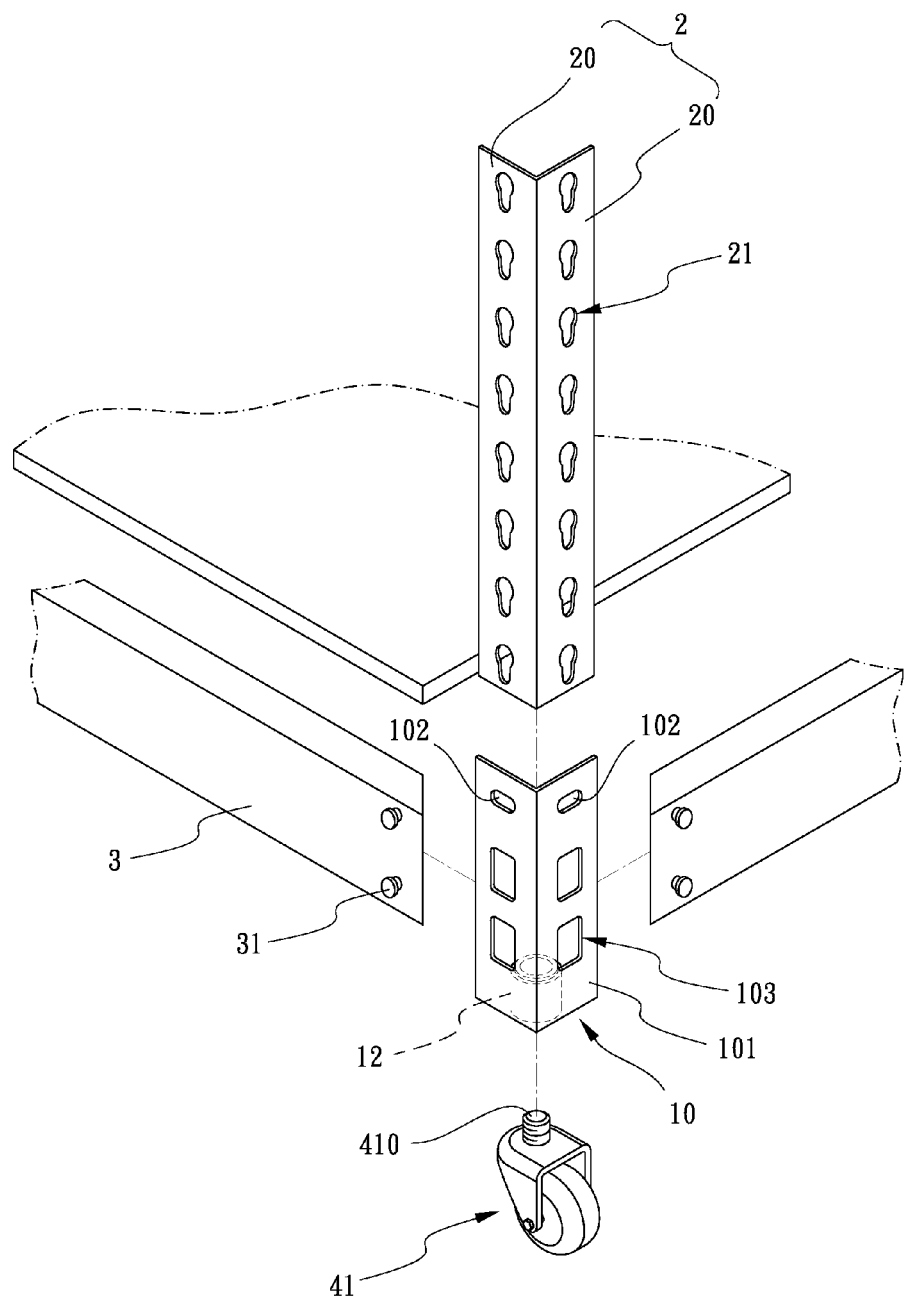
FIG. 3 is a partial, exploded perspective view of the cabinet shown in FIG. 2.
Figure 5:
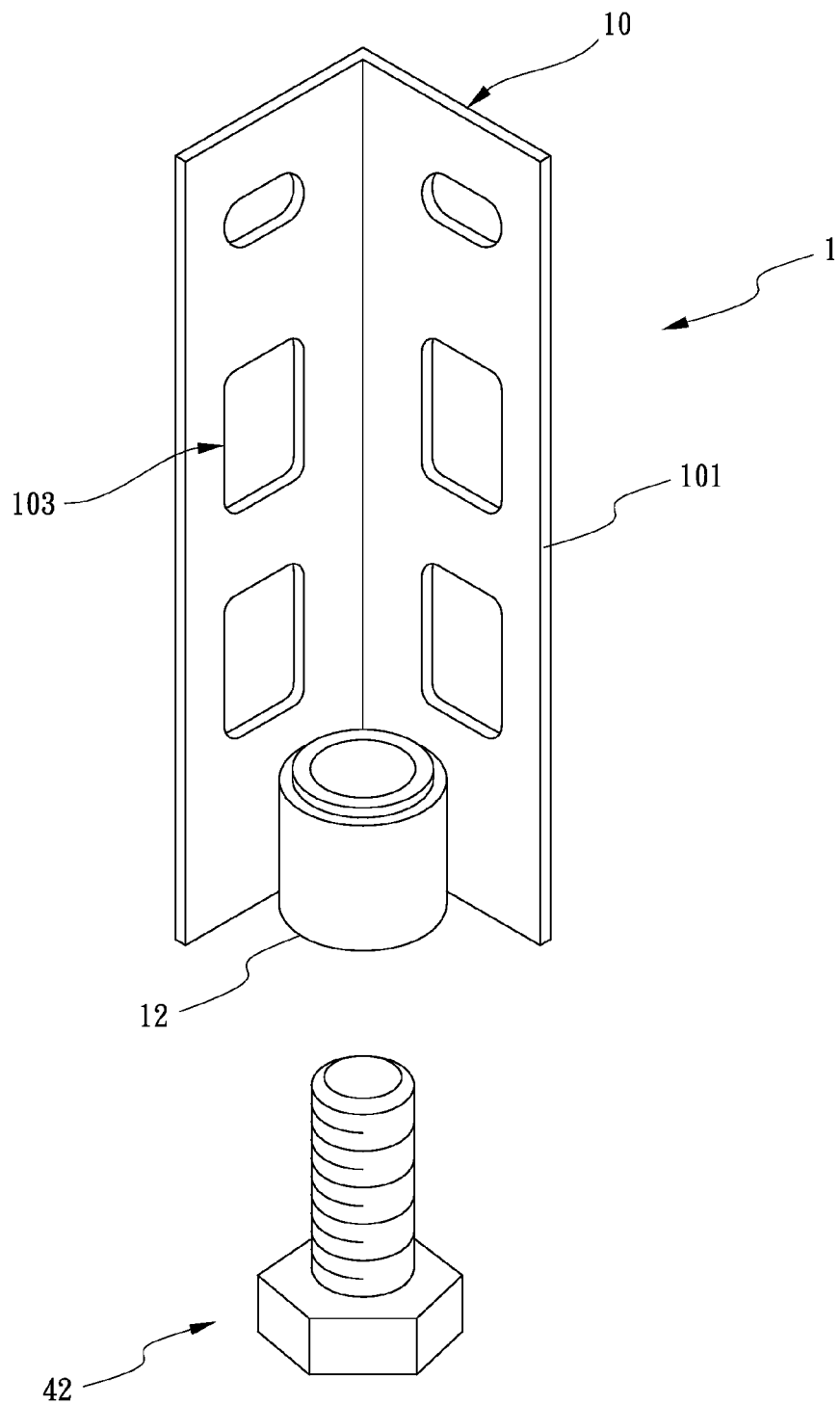
FIG. 5 is a perspective view of the supporting base shown in FIG. 1 and a screw feet to be joined to the supporting base.
Figure 6:
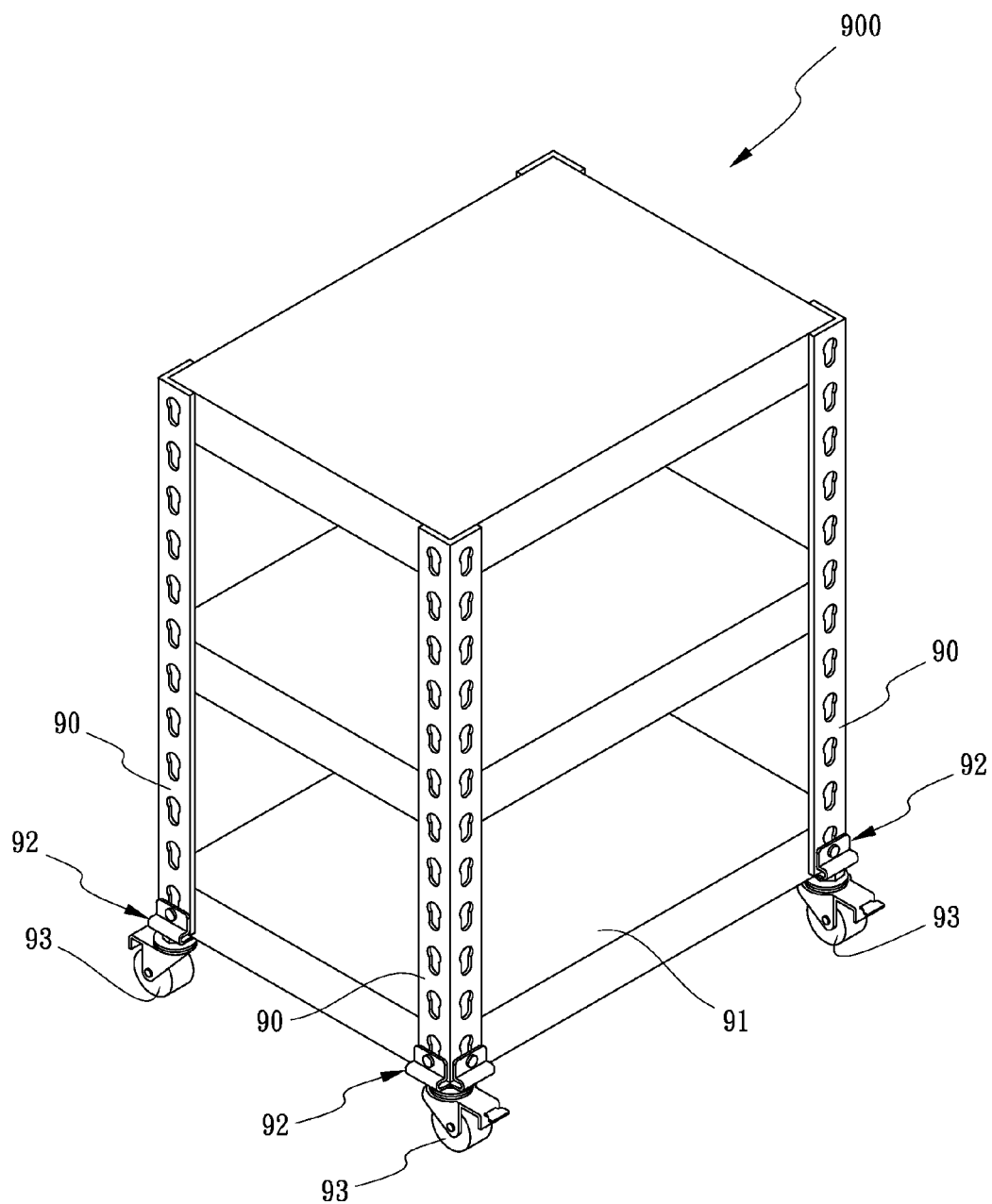
FIG. 6 is a prior art cabinet.
Figure 7:
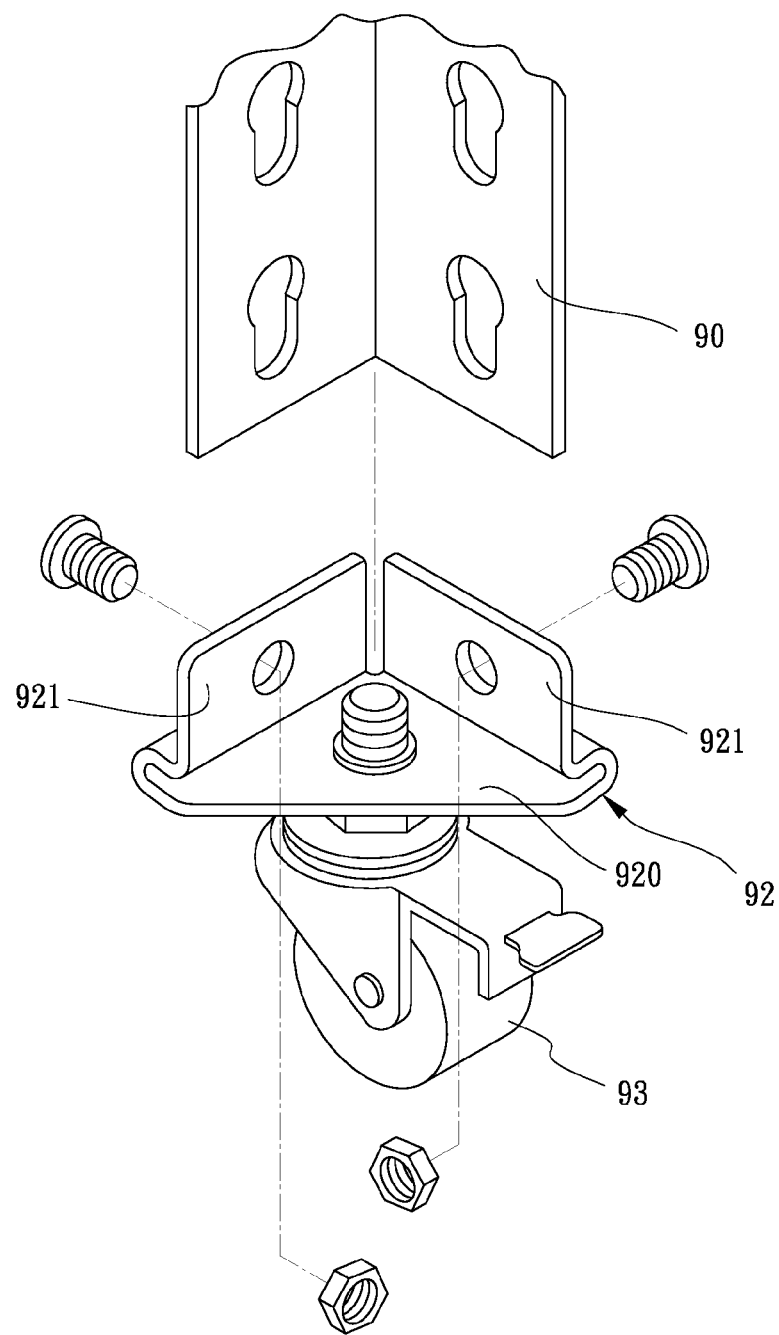
FIG. 7 is a partial, exploded perspective view of the cabinet shown in FIG. 6.

Referring again to FIG. 1, the column 12 of the supporting base 1 has a tapped hole 120 for assembly to an exterior component such as a caster 41 (FIG. 2), a screw leveling foot 42 (FIG. 5) or a screw jack (not shown). As shown in FIGS. 2 and 3, the caster 41 is formed with a bolt 410 screwed in the tapped hole 120 (FIG. 1) in a bottom of the column 12 so as to allow the cabinet 6 to be moved. In other examples, the caster 41 may be replaced by the screw leveling foot 42 (FIG. 5) or the screw jack to allow the cabinet 6 to be lifted slightly upward or downward for horizontal balance adjustment.

Referring to FIG. 3, each wall 20 of the angle iron post 2 defines a plurality of connecting holes 21 spaced apart in a distance. On the other hand, each wall 101 of the angle bar 10 has a connecting hole 102 for assembly to the angle iron post 2. The connecting hole 102 of the angle bar 2 is aligned with a selected one of the connecting holes 21 in the wall 20 of the angle iron post 2 so as to create a combination of aligned holes in which a bolt 51 is inserted and engages a nut 52 to secure the angle bar 10 and the angle iron post 2 together, as depicted in FIG. 2.

Moreover, each wall 101 of the angle bar 10 further defines two windows 103, the spacing of which corresponds to that of the respective connecting holes 21 in the wall 20 of the angle iron post 2. On the other hand, each of the angle iron beam 3 is formed with two protrusions 31 fastened in the respective connecting holes 21 in the wall 20 of the angle iron post 2, as depicted in FIG. 2. Specifically, each connecting hole 21 of the angle iron post 2 has an upper large-diameter end 211 and a lower small-diameter end 212 connected to each other. The protrusions 31 of the angle iron beam 3 has a diameter that is smaller than that of upper large-diameter end 211 but larger than that of the lower small-diameter end 212 of the connecting hole 21 such that the protrusions 31 may be firstly inserted into the upper large-diameter end 211 and then moved downward to the lower small-diameter end 212 to be locked in the connecting hole 21. In this way, the angle iron posts 2 and the angle iron beams 3 are well interconnected. In addition, the protrusions 31 of the angle iron beam 3 together with the connecting holes 21 of the angle bar 2 are exposed in the windows 103 of the wall 101 of the angle bar 10 to ensure if the angle iron posts 2 and the angle iron beams 3 are well locked together.

It is to be understood that the disclosed embodiments are illustrative in nature and the invention is not to be limited to any one or more embodiments except as set forth in the following claims.

What is claimed is:

1. A cabinet comprising:
   at least one angle iron post;
   at least one angle iron beam interconnected with the angle iron post; and
   at least one supporting base including a vertical angle bar having two walls arranged at right angle to each other, and a column disposed in between the two walls of the angle bar; the walls of the angle bar being superimposed on two respective walls of the angle iron post; and the column having an upper small-diameter section, a lower large-diameter section and a shoulder defined at the junction between the upper small-diameter section and the lower large-diameter section;
   wherein the two walls of the angle iron post are rested on the shoulder of the column of the supporting base and held in position between the walls of the angle bar and the upper small-diameter section of the column.

2. The cabinet of claim 1, wherein the column of the supporting base is secured to the walls of the angle bar by welding.

3. The cabinet of claim 1, further includes a caster joined to a bottom of the column.

4. The cabinet of claim 3, wherein the column of the supporting base defines a tapped hole therethrough, and the caster has a bolt screwed in the tapped hole of the column.

5. The cabinet of claim 1, further includes a screw leveling foot joined to a bottom of the column.

6. The cabinet of claim 5, wherein the column of the supporting base defines a tapped hole therethrough, and the screw leveling feet has a bolt screwed in the tapped hole of the column.

7. The cabinet of claim 1, wherein the column of the supporting base has a bottom surface flushed with that of the angle bar.

8. The cabinet of claim 1 further comprising a bolt and a nut, wherein the angle iron post defines a plurality of connecting holes spaced apart in a distance; each of the walls of the angle bar defines a connecting hole aligned with a selected one of the connecting holes in the wall of the angle iron post so as to create a combination of aligned holes in which the bolt is inserted and engages the nut to secure the angle bar and the angle iron post together.

9. The cabinet of claim 8, wherein at least one of the walls of the angle bar further defines two windows, the spacing of which corresponds to that of the respective connecting holes in the wall of the angle iron post; and the angle iron beam is formed with two protrusions fastened in the respective connecting holes in the wall of the angle iron post and exposed in the windows in the wall of the angle bar.

* * * * *